United States Patent
Lin et al.

(10) Patent No.: US 7,125,152 B2
(45) Date of Patent: Oct. 24, 2006

(54) BACKLIGHT MODULES

(75) Inventors: Hsin-Wu Lin, Tainan (TW); Pang-Hsuan Liu, Longtan Township, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/208,797

(22) Filed: Aug. 22, 2005

(65) Prior Publication Data

US 2006/0209564 A1    Sep. 21, 2006

(30) Foreign Application Priority Data

Mar. 17, 2005    (TW)    .............................. 94108164 A

(51) Int. Cl.
*F21V 7/04* (2006.01)
(52) U.S. Cl. ..................... 362/609; 362/618; 362/634
(58) Field of Classification Search ................ 362/346, 362/297, 29–30, 623–624, 618–619, 632–634, 362/627
See application file for complete search history.

(56) References Cited

U.S. PATENT DOCUMENTS

| 5,497,293 | A * | 3/1996 | Noguchi et al. | ............ 362/609 |
| 6,609,808 | B1* | 8/2003 | Chen | ......................... 362/632 |
| 2002/0015297 | A1* | 2/2002 | Hayashi et al. | ............... 362/27 |

* cited by examiner

*Primary Examiner*—Renee Luebke
*Assistant Examiner*—Julie A. Shallenberger
(74) *Attorney, Agent, or Firm*—Thomas, Kayden, Horstemeyer & Risley

(57) ABSTRACT

Backlight modules are provided. A backlight module includes a reflector, a light source disposed in the reflector, a substrate connected to the reflector, and a fixing mechanism. The reflector includes a first reflecting surface having a first opening and a second reflecting surface having a second opening. The fixing mechanism, connecting the first and second openings, is coated with a reflective material, to reflect light from the light source.

20 Claims, 4 Drawing Sheets

BACKLIGHT MODULES

BACKGROUND

The invention relates in general to backlight modules and in particular to backlight modules preventing reflector separation.

Referring to FIG. 1, a conventional backlight module comprises a frame F, a light guide element G and a reflector R. A light source (not shown) is accommodated in the reflector R, and light from the light source is reflected and guided to the light guide element G by the reflector R. In FIG. 1, two side plates R' are secured on the frame F by screws S.

Referring to FIG. 2, another conventional backlight module primarily comprises a light guide element G, a reflector R and a light source L disposed in the reflector R. The reflector R has two locking holes R1, and correspondingly, the light guide element G has two locking protrusions R1' joining in the locking holes R1, to fix the reflector R to a side of the light guide element G. Thus, light from the light source L can be reflected and guided to the light guide element G.

As to the conventional backlight modules shown in FIGS. 1 and 2, the reflector R and the light guide element G are fixed by the connection mechanisms disposed on opposite sides thereof. Loose connection in the middle portions of the reflector R and the light guide element G may cause the reflector R to separate from the light guide element G and lead to failure. Further, gaps may occur between the reflector R and the light guide element G, through which light may adversely leak. In large backlight modules, particularly, as the reflector R is much longer, the gaps and light leakage can be more serious.

SUMMARY

Backlight modules are provided. An exemplary embodiment of a backlight module includes a reflector, a light source disposed in the reflector, a substrate connected to the reflector, and a fixing mechanism. The reflector includes a first reflecting surface having a first opening and a second reflecting surface having a second opening. The fixing mechanism, connecting the first and second openings, is coated with a reflective material, to reflect light from the light source.

DETAILED DESCRIPTION

Figure 1:
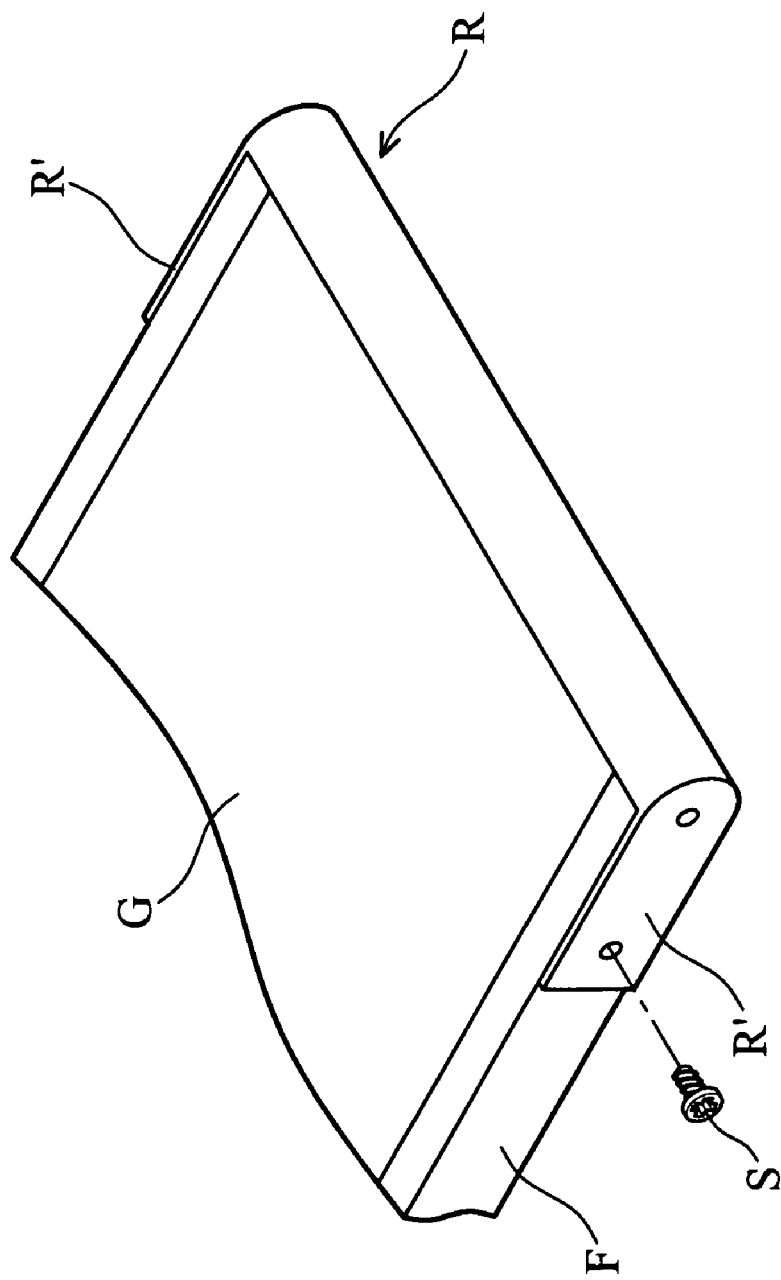
FIG. 1 is a perspective diagram of a conventional backlight module.
Figure 2:
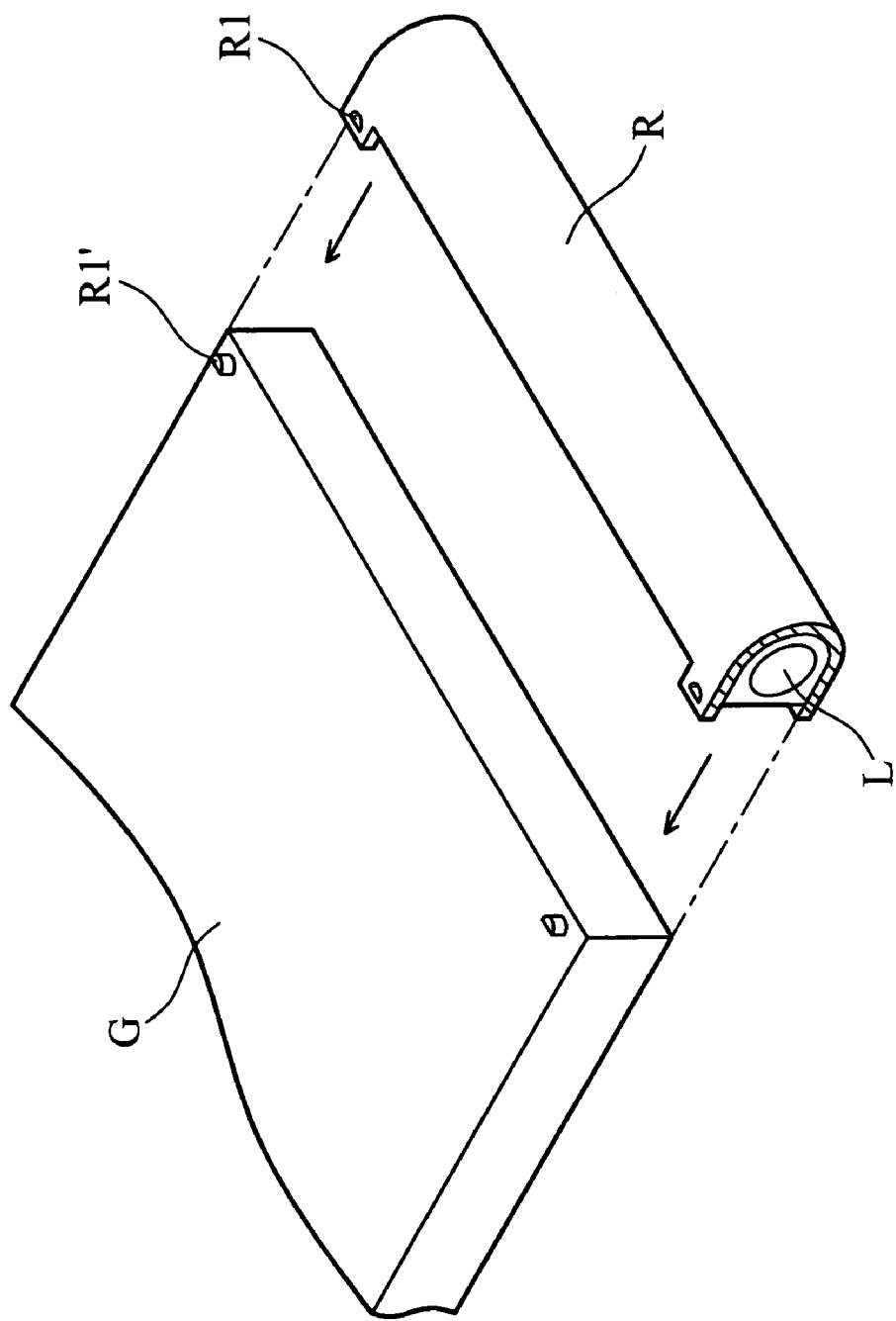
FIG. 2 is perspective diagram of another conventional backlight module.
Figure 3:
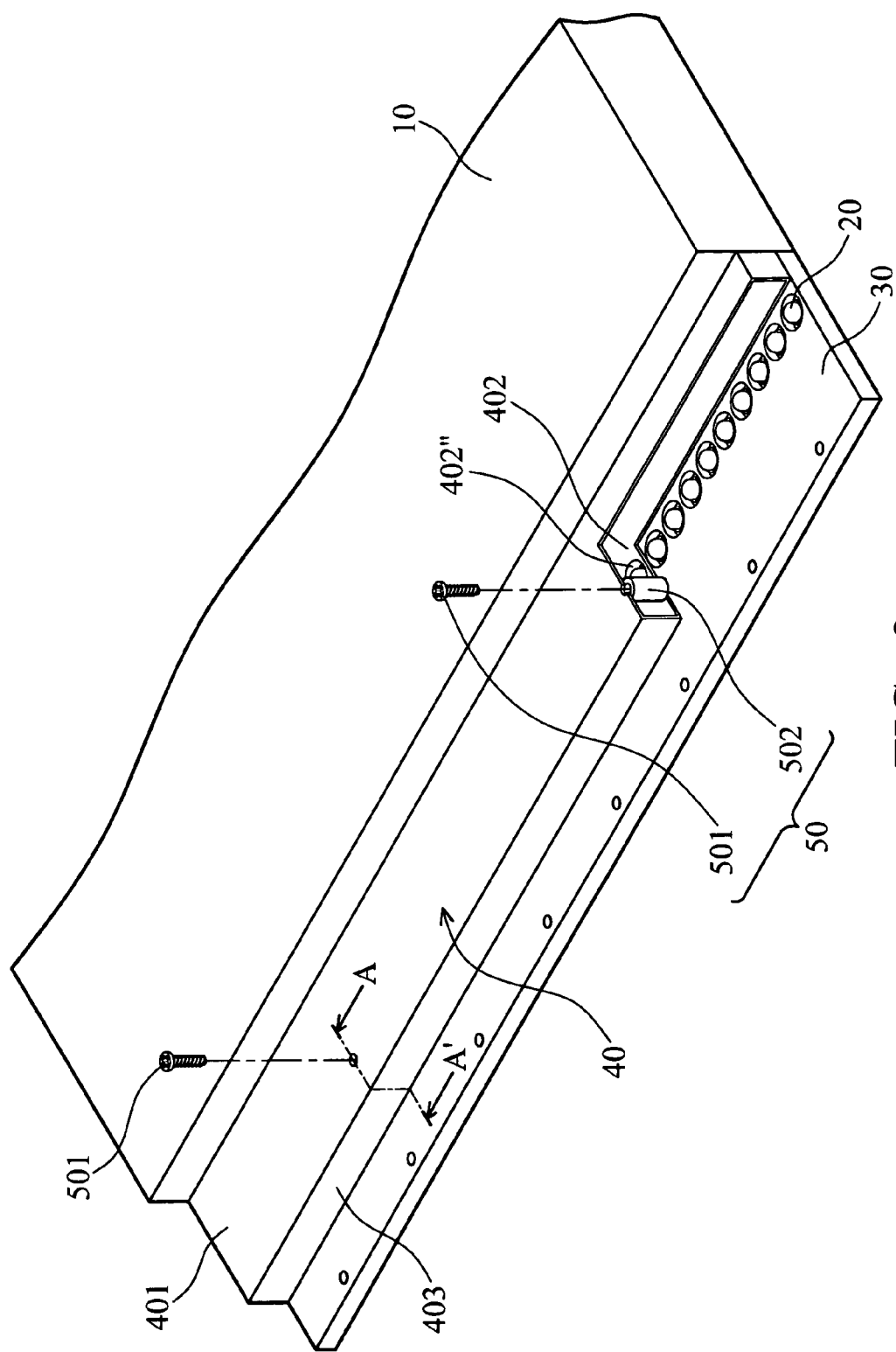
FIG. 3 is a perspective diagram of an embodiment of a backlight module.

Referring to FIG. 3, an exemplary embodiment of a backlight module for a flat panel display primarily comprises a light guide element 10, a plurality of light sources 20, a substrate 30 and a U-shaped reflector 40 mounted on a side of the light guide element 10. The light sources 20 are arranged in the reflector 40. Light from the light source L is reflected and guided to the light guide element 10 by the reflector 40, forming a planar emitting surface. In FIG. 3, the light sources 20, such as LEDs, are electrically connected to the substrate 30. In some embodiments, the light sources 20 can be substituted by a Cold Cathode Fluorescent Lamp (CCFL) accommodated in the reflector 40.

Figure 4:
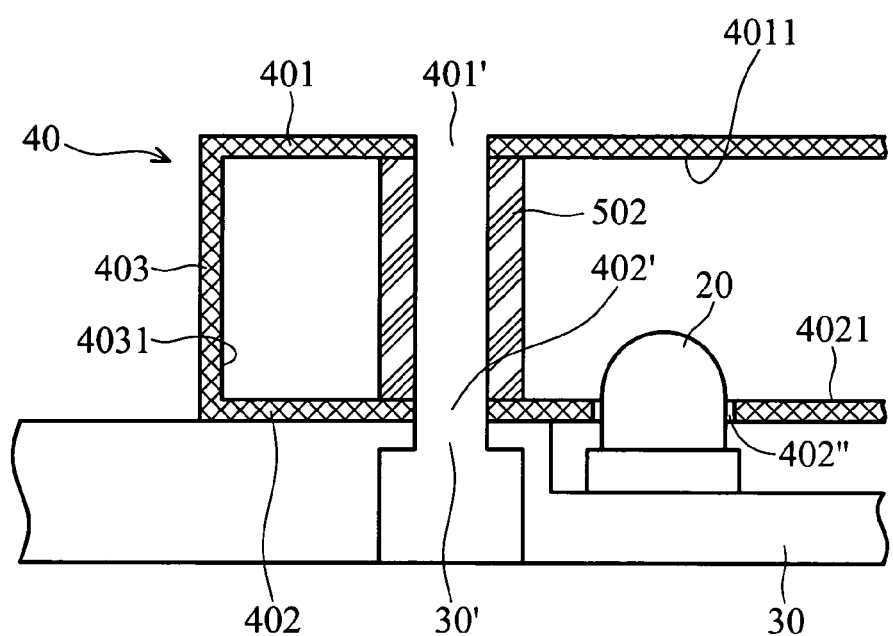
FIG. 4 is sectional view of A–A' in FIG. 3.
Figure 5:
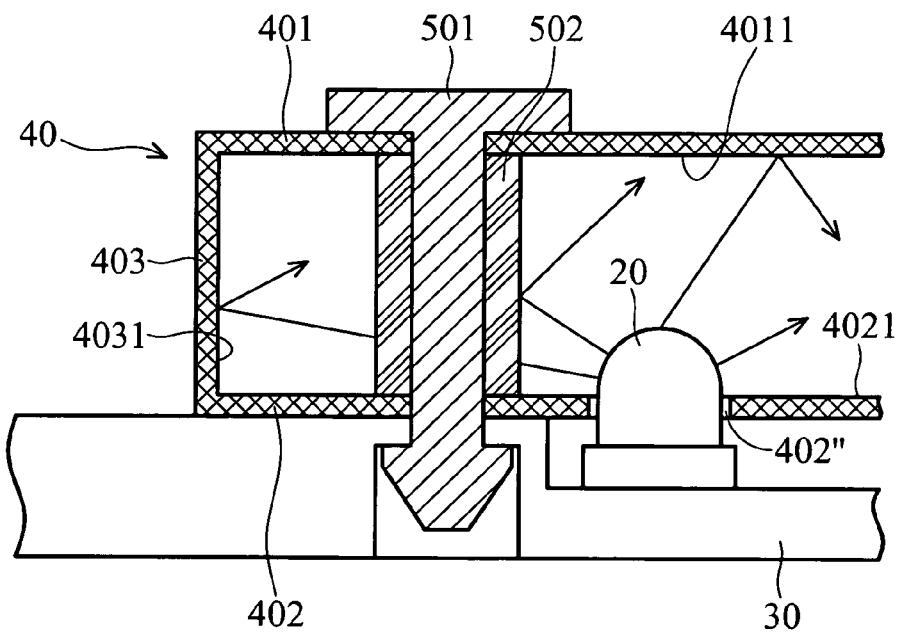
FIG. 5 is a perspective diagram of a substrate and a reflector secured by a fixing mechanism.

As shown in FIGS. 3–5, the substrate 30 connects the light guide element 10, and the reflector 40 is fixed to the substrate 30 by a plurality of fixing mechanisms 50. Each fixing mechanism 50 comprises a tubular member 502 and a fastener 501. In some embodiments, the fastener 501 can be a screw as shown in FIG. 3, however, it can also be a rivet as shown in FIG. 5. Hence, the reflector 40 can be fixed to the substrate 30 by fasteners 501, such as screws or rivets.

In FIGS. 3 and 4, the U-shaped reflector 40 comprises a first reflecting portion 401, a second reflecting portion 402 parallel to the first reflecting portion 401, and a third reflecting portion 403 connecting the first and second reflecting portions 401 and 402. The first reflecting portion 401 has a first reflecting surface 4011, the second reflecting portion 402 has a second reflecting surface 4021, and the third reflecting portion 403 has a third reflecting surface 4031, respectively. Referring to FIGS. 3–5, the light sources 20 pass through a plurality of holes 402" of the second reflecting portion 402 and are situated in the reflector 40. Light from the light source L can be reflected and guided to the light guide element 10 via the first, second and third reflecting surfaces 4011, 4021 and 4031.

As shown in FIG. 4, the first reflecting portion 401 has a first opening 401', and the second reflecting portion 402 has a second opening 402'. The tubular member 502 abuts the first and second reflecting surfaces 4011 and 4021, communicating the first and second openings 401' and 402'. In some embodiments, the tubular member 502 and the reflector 40 are integrally formed in a single piece, facilitating better structural strength and improving assembly efficiency.

Referring to FIG. 5, an exemplary embodiment of the fastener 501 is a rivet sequentially passing through the first opening 401', the tubular member 502, the second opening 402' and the third opening 30' of the substrate 30 (shown in FIG. 4), such that the reflector 40 and the substrate 30 are secured. In some embodiments, the fastener 501 can also be a screw as shown in FIG. 3, firmly connecting the reflector 40 and the substrate 30.

Specifically, the tubular member 502 is coated with reflective material to reflect light from the light sources 20. The fixing mechanism 50 has little effect on illumination of the backlight module even when situated in the effective illumination area of the reflector 40.

In some embodiments, the fixing mechanism 50 consists only of a screw or rivet fastened through the first opening 401', the second opening 402' and the third opening 30' of the substrate 30 to secure the reflector 40 and the substrate 30. Specifically, the screw or rivet is coated with a reflective material, to reflect light from the light sources 20.

Backlight modules with fixing mechanisms firmly securing the reflector and the substrate are provided according to the embodiments. The reflector and the substrate can be firmly connected, protecting the reflector from separation and failure. Specifically, since the fixing mechanisms have little effect on illumination of the backlight module, they can be disposed in the effective illumination area of the reflector.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module for a flat display device, comprising:
   a reflector having a first reflecting surface and a second reflecting surface, wherein the first reflecting surface has a first opening, and the second reflecting surface has a second opening;
   a light source disposed in the reflector;
   a substrate connected to the reflector; and
   a fixing mechanism, fastened on the substrate through the first and second openings and coated with a reflective material, for reflecting light from the light source.

2. The backlight module as claimed in claim 1, wherein the reflector is substantially U-shaped.

3. The backlight module as claimed in claim 1, wherein the fixing mechanism comprises a screw with reflective material coated thereon, and the substrate and the reflector are secured together by the screw.

4. The backlight module as claimed in claim 1, wherein the fixing mechanism comprises a rivet with reflective material coated thereon, and the substrate and the reflector are secured together by the rivet.

5. The backlight module as claimed in claim 1, wherein the fixing mechanism comprises a fastener and a tubular member abutting the first and second reflecting surfaces and communicating the first and second openings, the substrate comprises a third opening, and the fastener sequentially passes through the first opening, the tubular member, the second opening and the third opening, wherein the reflective material is coated on the tubular member.

6. The backlight module as claimed in claim 5, wherein the tubular member and the reflector are integrally formed in one piece.

7. The backlight module as claimed in claim 1, wherein the light source is electrically connected to the substrate.

8. The backlight module as claimed in claim 7, wherein the light source comprises a cold cathode fluorescent lamp (CCFL).

9. The backlight module as claimed in claim 7, wherein the light source comprises a light emitting diode (LED).

10. The backlight module as claimed in claim 9, wherein the second reflecting surface further comprises a hole with the LED passing therethrough.

11. A backlight module for a flat display device, comprising:
    a U-shaped reflector having a first reflecting portion and a second reflecting portion parallel to the first reflecting portion, wherein the first reflecting portion has a first opening, and the second reflecting portion has a second opening;
    a light source disposed between the first and second reflecting portions;
    a substrate connected to the reflector; and
    a fixing mechanism sequentially fastened through the first opening and the second opening to secure the substrate and the reflector, wherein the fixing mechanism has a reflective material coated thereon.

12. The backlight module as claimed in claim 11, wherein the fixing mechanism comprises a screw with reflective material coated thereon, and the substrate and the reflector are secured by the screw.

13. The backlight module as claimed in claim 11, wherein the fixing mechanism comprises a rivet with reflective material coated thereon, and the substrate and the reflector are secured by the rivet.

14. The backlight module as claimed in claim 11, wherein the reflector further comprises a third reflecting portion connecting the first and second reflecting portions, forming substantially a U-shaped structure.

15. The backlight module as claimed in claim 11, wherein the fixing mechanism comprises a fastener and a tubular member abutting the first and second reflecting surfaces and communicating the first and second openings, the substrate comprises a third opening, and the fastener sequentially passes through the first opening, the tubular member, the second opening and the third opening, wherein reflective material is coated on the tubular member to reflect light from the light source.

16. The backlight module as claimed in claim 15, wherein the tubular member and the reflector are integrally formed in one piece.

17. The backlight module as claimed in claim 11, wherein the light source is electrically connected to the substrate.

18. The backlight module as claimed in claim 17, wherein the light source comprises a cold cathode fluorescent lamp (CCFL).

19. The backlight module as claimed in claim 17, wherein the light source comprises a light emitting diode (LED).

20. The backlight module as claimed in claim 19, wherein the second reflecting surface further comprises a hole with the LED passing therethrough.

* * * * *